(12) United States Patent
Konigorski

(10) Patent No.: US 6,474,436 B1
(45) Date of Patent: Nov. 5, 2002

(54) STEERING SYSTEM AND METHOD FOR A VEHICLE

(75) Inventor: Ulrich Konigorski, Clausthal-Zellerfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/360,243

(22) Filed: Jul. 23, 1999

(30) Foreign Application Priority Data

Jul. 23, 1998 (DE) ......................................... 198 33 189

(51) Int. Cl.⁷ ................................................ B62D 5/00
(52) U.S. Cl. .......................... 180/402; 701/42; 180/444
(58) Field of Search ................................... 180/402, 494, 180/446, 447, 443; 701/42

(56) References Cited

U.S. PATENT DOCUMENTS

| | | | |
|---|---|---|---|
| 5,072,804 A | 12/1991 | Bischof et al. | 180/142 |
| 5,323,866 A | 6/1994 | Simard et al. | |
| 5,653,304 A | * 8/1997 | Renfroe | 180/402 |
| 5,828,972 A | 10/1998 | Asanuma et al. | |
| 5,896,942 A | * 4/1999 | Bohnet et al. | 180/402 |
| 6,059,068 A | * 5/2000 | Kato et al. | 180/402 |
| 6,079,513 A | * 6/2000 | Nishizaki et al. | 180/402 |
| 6,082,482 A | * 7/2000 | Kato et al. | 180/402 |

FOREIGN PATENT DOCUMENTS

| | | |
|---|---|---|
| DE | 29 42 532 | 4/1981 |
| DE | 38 23 413 | 1/1990 |
| DE | 39 30 445 | 3/1990 |
| DE | 41 28 639 | 3/1993 |
| DE | 42 32 256 | 4/1993 |
| DE | 42 41 849 | 6/1994 |
| DE | 44 10 361 | 9/1995 |
| DE | 195 19 875 | 7/1996 |
| DE | 198 01 974 | 7/1998 |
| EP | 0 416 266 | 3/1991 |
| EP | 0 683 086 | 11/1995 |
| EP | 0 775 624 | 5/1997 |
| EP | 0 854 075 | 7/1998 |

* cited by examiner

Primary Examiner—Robert P. Olszewski
Assistant Examiner—Andrew J. Fischer
(74) Attorney, Agent, or Firm—Crowell & Moring LLP

(57) ABSTRACT

A steering system for a vehicle has a steering operating device, an operating moment sensor which is assigned to the steering operating device and which senses the operating moment exercised on the steering operating device and generates a corresponding signal, and a steering angle sensor which senses a steering angle corresponding to the alignment of the steerable wheels and supplies a corresponding signal to a control unit which, in turn, determines a pertaining desired angle of the steering operating device. The control unit is constructed in order to process the signal generated by the operating moment sensor and emit an assigned desired steering moment or an assigned desired steering force. A steering device, which is mechanically uncoupled from the steering operating device, sets the desired steering moment or the desired steering force at the steerable wheels. A feedback unit is provided for setting the determined desired angle at the steering operating device.

13 Claims, 1 Drawing Sheet

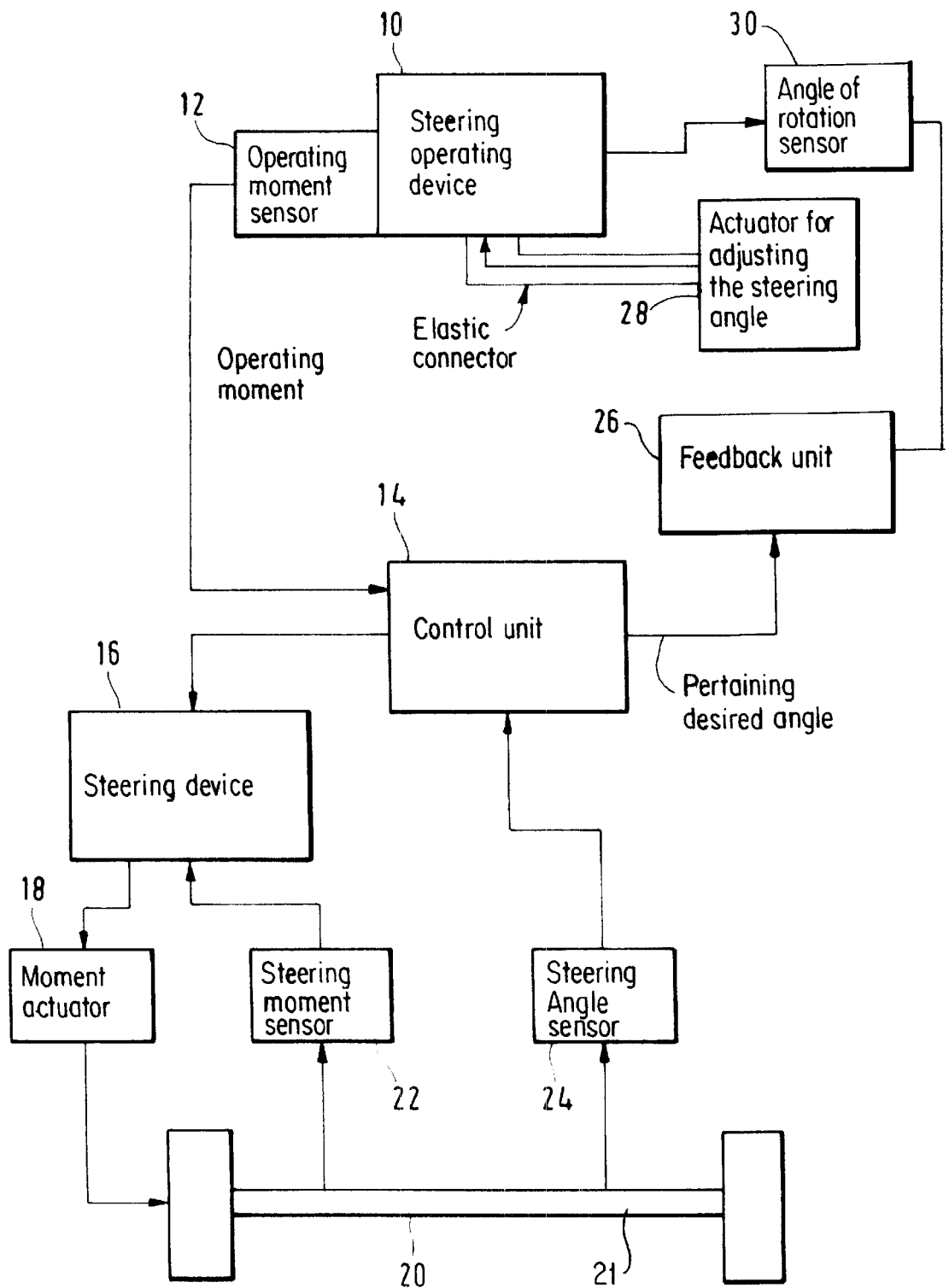

STEERING SYSTEM AND METHOD FOR A VEHICLE

BACKGROUND AND SUMMARY OF THE INVENTION

This application claims the priority of German Application No. 198 33 189.4, filed Jul. 23, 1998.

The invention relates to a steering system for a vehicle and a method for steering a vehicle.

Steering systems are known in which a steering operating device is mechanically uncoupled from the steering device exercising the force upon the wheels. Such an arrangement has, for example, the advantage that steering corrections, which become necessary because of criteria concerning the directional control and the driving dynamics, can be taken into account more easily and the steering performance can be correspondingly adapted to a respective driving situation. Furthermore, a less complicated construction is obtained, and the steering operating unit can be arranged in the vehicle in a more variable manner.

For example, steering systems are known, wherein a steering angle is tapped at the steering wheel and is set at the wheels by way of a control unit (compare German Patent Document DE 39 30 445 A1). In addition, the counterforce from the wheel-road effect affecting the wheels is determined and is fed back to the steering wheel so that, by way of this fed-back moment, the driver is provided with a vehicle handling sensation which corresponds to a mechanical handling sensation.

However, such steering systems have the disadvantage that steering vibrations may occur because of the static friction in the steering gear, particularly when the driver lets go of the steering wheel.

From European Patent Document EP 0 775 624 A2, a steering system is known, in which an operating moment can be tapped on a steering operating unit which is converted into a control current by a control unit. This control current, in turn, acts upon an actuator operating the steerable wheels. In addition, by means of a sensor, the steering angle of the wheel is determined. A corresponding signal is processed together with other signals by the control unit and a pertaining restoring moment is fed back to the operating unit. The vehicle driver operates the steering operating unit against this restoring moment.

It is an object of the invention to provide a simple steering system of the above-mentioned type which can effectively provide a good vehicle handling sensation without the occurrence of vibrations because of static friction in the steering system.

It is also an object of the invention to provide a method which provides a good vehicle handling sensation.

This object is achieved by a steering system with a steering operating device, an operating moment sensor which is assigned to the steering operating device and which senses the operation moment exercised on the steering operating device and generates a corresponding signal, a control unit which is constructed to process the signal generated by the operating moment sensor and emit an assigned desired steering moment or an assigned desired steering force, a steering device which is mechanically uncoupled from the steering operating device and which gets the desired steering moment or the desired steering force at the steering wheels, a steering angle sensor which senses a steering angle corresponding to the alignment of the steerable wheels and supplies a corresponding signal to the control unit which, in turn, determines a pertaining desired angle of the steering operating device and a feedback unit which sets the determined desired angle at the steering operating device.

The object is also achieved by a method for steering a vehicle, comprising the acts of sensing a moment or force being exerted on a steering operating device, processing the operating moment by the control unit and generating an assigned desired steering moment or steering force, setting the assigned desired steering moment or steering force at the steerable wheels, sensing a steering angle corresponding to the alignment of the steerable wheels, determining a pertaining desired angle of the steering operating device by the control unit based upon the sensed steering angle and setting the pertaining desired angle of the steering operating device.

Accordingly, the steering system for a vehicle according to the invention is constructed such that, in principle, a moment input is determined on a steering operating element and a steering angle is fed back to it. A steering moment computed by the control unit is fed to the wheels. The wheels will then automatically adjust such that this moment and the countermoment originating from the wheel-road effect compensate one another (balancing of moments). In this case, the desired steering moment defined by the control unit corresponds to the moment which is generated by the lateral wheel force.

In this context, it is particularly pointed out that the terms "steering moments" and "steering forces" are to have the same formal meaning.

In a feedback loop, the actually occurring (equilibrium) steering angle of the steerable wheels is determined first and is transmitted to the control unit. This control unit computes a pertaining desired angle at the steering operating unit, which is set by way of a feedback unit.

On the whole, therefore, a defined moment is set at the wheels in a first branch of the control. In the second branch of the control, the detected steering angle is transmitted back to the steering operating unit.

This simple control defines a steering system which provides an effective and good vehicle handling sensation, without any vibration effects due to static friction in the steering system.

According to an advantageous embodiment of the steering system, the moment is set at the wheels in an automatic control operation (separate control loop). For this purpose, a moment sensor senses the actual steering moment currently existing at the wheel and compares it with the desired steering moment. If a deviation between the two values is determined, the steering device will operate the wheels such that the actual steering moment will correspond to the required desired steering moment.

Analogously, a preferred embodiment of the invention is characterized such that, in a further automatic control (another separate control loop), the angle is set at the steering operating unit. For this purpose, an angle of rotation sensor detects the actual angle of rotation existing at the steering operating device and compares it with the desired angle computed by the control unit. If a deviation is determined between the two values, the steering operating device is controlled such that the actual angle of rotation corresponds to the desired angle.

The actuating devices provided for operating the wheel or the steering operating device may have an electric, hydraulic or pneumatic or other known construction.

Since the steering systems are generally safety-relevant to a high degree, preferably all hardware and software elements included in the steering system are provided in a redundant manner.

The steerable wheels may be connected with one another by way of a wheel linkage. As an alternative, each wheel can be separately steerable, e.g. by actuators assigned to each steerable wheel, respectively.

According to a preferred embodiment of the invention, the connection between the steering operating device and the actuator for adjusting the desired angle at the steering operating device has an elastic design; for example, by means of a torsion spring. The elastic design substitutes for an elasticity which is incorporated in a conventionally mechanically coupled steering system by way of various mechanical components and connections.

Of course, one could also compute the desired steering moment or the desired angle such that a virtual elasticity or stiffness is created between the vehicle driver's input and the wheel-road effect. This measure improves comfort and vehicle handling and increases the directional control.

An advantage of a mechanical uncoupling of the steering operating device and the steering device consists of the simple compensation of various influences concerning the directional control and the driving dynamics. For this purpose, the control unit can be constructed such that additional parameters, such as the vehicle speed, the yaw rate, the slip angle, the road condition, the lateral acceleration or other characteristic data, are analyzed and taken into account when forming the desired steering moments and/or the desired angles.

Other objects, advantages and novel features of the present invention will become apparent from the following detailed description of the invention when considered in conjunction with the accompanying drawings.

BRIEF DESCRIPTION OF THE DRAWING

The single drawing illustrates a schematic logical circuit outline of an embodiment of the invention.

DETAILED DESCRIPTION OF THE DRAWING

In the single figure, a steering operating device 10 (for example, a steering wheel) is provided. The steering operating device 10 is to be operated by a driver. An operating moment sensor 12 is assigned to the steering operating device 10. The operating moment sensor 12 senses the operating force defined by the vehicle driver at the steering operating device 10 or the operating moment and transmits it to a control unit 14. The control unit 14 computes, at least on the basis of the operating moment input, a value for the desired steering moment which is to be set at the wheels. As mentioned above, the terms "desired or actual moments" also include "desired or actual forces".

Additional parameters such as the vehicle speed, the yaw rate, the slip angle, the road condition, the lateral acceleration, and similar parameters influencing the comfort, the vehicle handling and the directional control can be transmitted to the control unit 14 which adapts the desired steering moment, which is to be determined, corresponding to defined correction algorithms. Different algorithms can be chosen depending on the desired vehicle handling sensation.

The thus calculated desired steering moment is transmitted to a steering device 16 which acts upon a moment actuator 18. This moment actuator 18 is operably connected to the wheels 20 and moves the wheels 20 such that the desired steering moment is present at the wheels 20.

In the present case, two wheels are connected with one another by means of a steering linkage 21. The steering linkage is moved by way of a steering gear (not shown) driven by the moment actuator 18.

As an alternative, the wheels can also be addressed and actuated separately. A corresponding number of moment actuators should then be provided acting on assigned wheels.

Simultaneously, the actual steering moment present at the wheels is sensed by a moment sensor 22 and is transmitted back to the steering device 16. The steering device 16 compares the desired steering moment input and the actual steering moment value and emits a signal to the moment actuator 18 such that the actual steering moment value is adapted as fast as possible to the desired steering moment value. To this extent, the unit consisting of the steering device 16, the moment actuator 18, the wheel 20 and the moment sensor 22 represents a separate (automatic) control unit.

Furthermore, the steering angle occurring at the wheels is determined by way of a steering angle sensor 24 and transmitted in a feedback loop to the control unit 14. The control unit 14 then computes a corresponding desired angle for the steering operating device 10 and transmits it to a feedback unit 26.

The feedback unit 26 acts upon an actuator 28 by means of a signal for setting the desired angle at the steering operating device 10. In parallel, an angle of rotation sensor 30 senses the actual angle of rotation currently present at the steering operating device 10 and transmits it back to the feedback unit 26. This feedback unit 26 then acts upon the actuator 28 such that the actual angle of rotation present at the steering operating device 10 is adjusted to the desired angle of rotation.

To this extent, the unit consisting of the feedback unit 26, the actuator 28, the steering operating device 10 and the angle of rotation sensor 30 also represents an automatic control system.

By means of the described embodiment of the steering system, the operating moment defined by the driver or its operating force is measured and is transmitted by way of the control unit to the wheels. For providing the vehicle handling sensation, instead of the counterforce of the wheel-road effect, the occurring wheel angle is measured and is also transmitted back by way of the control unit to the steering operating unit. The operating loop, which corresponds to a specific steering method, is as follows:

The driver of the vehicle defines a desired steering moment or a desired steering force at the steering operating device.

The desired steering moment or the desired steering force is measured by the operating moment sensor 12 and is transmitted to the control unit 14.

From the steering operating moment desired by the driver or the desired steering operating force and other vehicle parameters, such as the vehicle speed, etc., the control unit 14 computes a desired steering moment and sends a corresponding command to the steering device 16 which exerts a respective moment via the moment actuator 18 on the wheels.

On the whole, a moment is therefore transmitted to the wheels. The wheels thus adjust such that a balanced condition is achieved between it and the moment (lateral wheel force) returning from the wheel-road effect.

The steering angle occurring by way of the balancing of forces with the wheel-road effect is measured by the steering angle sensor 24 and is transmitted to the control unit 14.

From the measured steering angle and other vehicle parameters, the control unit 14 computes a pertaining desired angle for the steering operating device 10 and emits it to the feedback unit 26 or actuator 28 mechanically operatively connected with the steering operating device 10.

The feedback unit 26, via the actuator 28 and an elastic design connection 34, sets the angle of the operating unit commanded by the control unit 14 at the steering operating device. This thus provides the driver with a vehicle handling sensation similar to a mechanical power steering.

The above-mentioned steering system corresponds to a power steering system and has all known advantages with respect to a manual steering. Also in the case of a hydraulic power steering system, the steering operating moment defined by the driver is determined by way of a torsion bar and, amplified by the power assist, is applied to the steerable wheels.

Furthermore, there is no vibration problem because a wheel moment is set directly at the wheels, which wheel moment already contains a static friction present in the wheel linkage. To this extent, the static friction part results in no reaction movement.

Overall, the present steering system provides a simple possibility of representing a mechanically uncoupled steering with a good vehicle handling sensation, in which case no undesirable vibrations arise at the steering operating device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a vehicle, comprising:
    a manually operated steering operation device;
    an operating moment sensor coupled to the steering operation device and generating a first signal corresponding to an operating moment exercised on the steering operation device;
    a control unit receiving the first signal generated by the operating moment sensor and emitting a second signal corresponding to an assigned desired steering moment or an assigned desired steering force;
    a steering device coupled to steerable wheels and mechanically uncoupled from the steering operation device, receiving the second signal corresponding to the assigned desired steering moment or the assigned desired steering force from the control unit and operating the steerable wheels so that the assigned desired steering moment or the assigned desired steering force is set at the steerable wheels;
    a steering angle sensor coupled to the steerable wheels and supplying a third signal corresponding to an alignment of the steerable wheels to the control unit which, in turn, determines a pertaining desired angle of the steering operation device and generates a corresponding fourth signal; and
    a feedback unit coupled to the steering operation device, receiving the fourth signal corresponding to the desired angle of the steering operation device and outputting a fifth signal as a function of said fourth signal corresponding to the desired angle of the steering operation device to operate the steering operation device so that the desired angle is set at the steering operation device.

2. The steering system according to claim 1, wherein the steering device comprises a steering moment sensor which senses an actual steering moment or an actual steering force present at the steerable wheels, and further wherein the steering device adjusts the actual steering moment to the desired steering moment or the actual steering force to the desired steering force.

3. The steering system according to claim 1, further comprising an angle of rotation sensor which senses the actual angle of rotation present at the steering operation device, and further wherein the feedback unit adjusts the actual angle of rotation to the desired angle.

4. The steering system according to claim 3, further comprising an actuator and an elastic connector, the elastic connector coupling the steering operation device and the actuator.

5. The steering system according to claim 2, further comprising an angle of rotation sensor which senses the actual angle of rotation present at the steering operation device, and further wherein the feedback unit adjusts the actual angle of rotation to the desired angle.

6. The steering system according to claim 5, comprising an actuator and an elastic connector, the elastic connector coupling the steering operation device and the actuator.

7. The steering system according to claim 1, wherein said system is a power steering system.

8. The steering system according to claim 1, wherein at least two elements of the steering system are provided in a redundant manner.

9. The steering system according to claim 1, further comprising a steering linkage connecting the steerable wheels with one another.

10. The steering system according to claim 1, wherein each one of the steerable wheels is separately steerable.

11. The steering system according to claim 1, wherein the control unit computes at least one of the desired steering moment and the desired steering angle such that a virtual elasticity is created between an input and a wheel-road effect.

12. The steering system according to claim 1, wherein the control unit receives and factors into account at least one additional parameter when forming at least one of the desired steering moment and the desired angle.

13. The steering system according to claim 12, wherein the at least one additional parameter is at least one of a vehicle speed, a yaw rate, a slip angle, a road condition and a lateral acceleration.

* * * * *